(12) United States Patent
Kim et al.

(10) Patent No.: US 6,348,676 B2
(45) Date of Patent: Feb. 19, 2002

(54) RAPID COOKING DEVICE USING INFRARED LIGHT

(75) Inventors: Yang Kyeong Kim, Inchon; Jong Gwan Ryu, Seoul; Wan Soo Kim, Kwangmyeong; Sung Jin Han, Seoul, all of (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/750,442

(22) Filed: Dec. 28, 2000

(30) Foreign Application Priority Data

Mar. 25, 2000 (KR) .............................. 00-15330

(51) Int. Cl.[7] .......................... A21B 1/22; F27D 11/00
(52) U.S. Cl. ..................................... 219/411; 219/405
(58) Field of Search ................................. 219/391, 399, 219/405, 411; 392/408

(56) References Cited

U.S. PATENT DOCUMENTS

| 4,761,529 A | * | 8/1988 | Tsisios | 219/685 |
| 4,771,154 A | * | 9/1988 | Bell et al. | 219/399 |
| 5,382,441 A | * | 1/1995 | Lentz et al. | 426/241 |

FOREIGN PATENT DOCUMENTS

| DE | 2546106 | * | 4/1977 |
| GB | 2152790 | * | 8/1985 |
| JP | 1-235550 | * | 9/1989 |

* cited by examiner

Primary Examiner—Joseph Pelham
(74) Attorney, Agent, or Firm—Ostrolenk, Faber, Gerb & Soffen, LLP

(57) ABSTRACT

The present invention relates to a device capable of cooking food products in a short time so as to concentrate the emitted light on the food product using a lamp emitting light in an infrared region. More particularly, it is capable of cooking the food product in a short time by concentrating light in the visible light region within a wavelength range of more than 1.35 μm on the food product using a luminous unit for emitting light in the infrared light region and a reflecting plate for concentrating the emitted light in the infrared light region.

3 Claims, 3 Drawing Sheets

RAPID COOKING DEVICE USING INFRARED LIGHT

BACKGROUND OF THE INVENTION

1. Field of the Invention

The present invention relates to a device capable of cooking food products in a short time using a lamp emitting infrared light, and more particularly, to a rapid cooking device using infrared light which is capable of rapidly cooking the food product so as to concentrate the emitted light on the food product using a lamp emitting light in an infrared light region.

2. Description of the Background Art

Conventional heating apparatuses for cooking food products have been provided in a variety of types in the past. For example, there has been provided an electronic range which heats the food product in such a manner that microwaves are generated out of electricity, and the microwaves impinge into the food product, causing molecular motion in the interior product, thus heating the food product.

Besides, there has been provided a device for cooking the food product using a heater, for example, a cooking device using light waves as a heat source. Such a device employing a lamp wherein more than 90% of radiant energy has a wavelength of less than 1 μm cooks the surface and interior of an heating object using visible light and near infrared emitted from the lamp. That is, heating of the food product starts from its surface, and then heat is transferred to the interior by conduction. For example, pizza crusts become fully cooked with crispy exteriors and moist, soft interiors.

For a detailed description of the above-said conventional cooking devices using infrared light and visible light, see U.S. Pat. No. 4,481,405 (Inventors: Malick; Franklin S.), and U.S. Pat. No. 4,486,639 (Inventors: Mittlesteadt; Robert A.).

FIG. 1 is a view illustrating a construction of a cooking device according to the conventional art. As illustrated therein, the cooking device includes: an outer wall 10 and inner wall 11 for protecting the cooking device; emitting lamps 12 installed at an upper portion and lower portion of the inner wall 11; transparent plates 13 installed between the emitting lamps 12 to pass light emitted from the emitting lamps 12; a platter 15 installed between the transparent plates 13 to support food products; and support brackets 14 for supporting the transparent plates 13 and the platter 15. The above construction will now be described in detail by taking a pizza 16 placed on the platter 15 as an example.

First, when power is applied to each emitting lamp 12, the emitting lamp 12 generates at least more than 4 KW of radiant energy in a visible light region. The generated radiant energy in the visible light region impinges into lower and upper portions of the pizza after passing through the transparent plates 13. In other words, the pizza is cooked by absorbing the radiant energy in the visible light region.

However, since food products have a larger absorption rate in the infrared light region as compared to the visible light region, in case of using radiant energy in the visible light region, there is a problem that it takes longer to cook the food as compared to the case of using radiant energy in the infrared light region.

SUMMARY OF THE INVENTION

Accordingly, it is an object of the present invention to provide a rapid cooking device using infrared light which is capable of rapidly cooking the food product in an infrared light region so as to concentrate the emitted light on the food product using a lamp emitting light.

To achieve the above object of the present invention, there is provided a rapid cooking device which includes: a luminous unit for emitting light in an infrared light region within the wavelength range of more than 1.35 μm at more than 65% of the total radiant energy; a reflecting plate installed at an upper portion of the luminous unit and adapted to reflect the light emitted from the luminous unit to a target product; a mesh unit having a plurality of penetration holes installed at a lower portion of the luminous unit for thereby directly passing the light emitted from the luminous unit and the light reflected from the reflecting plate; and a filter installed at a lower portion of the mesh unit for thereby protecting the luminous unit.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
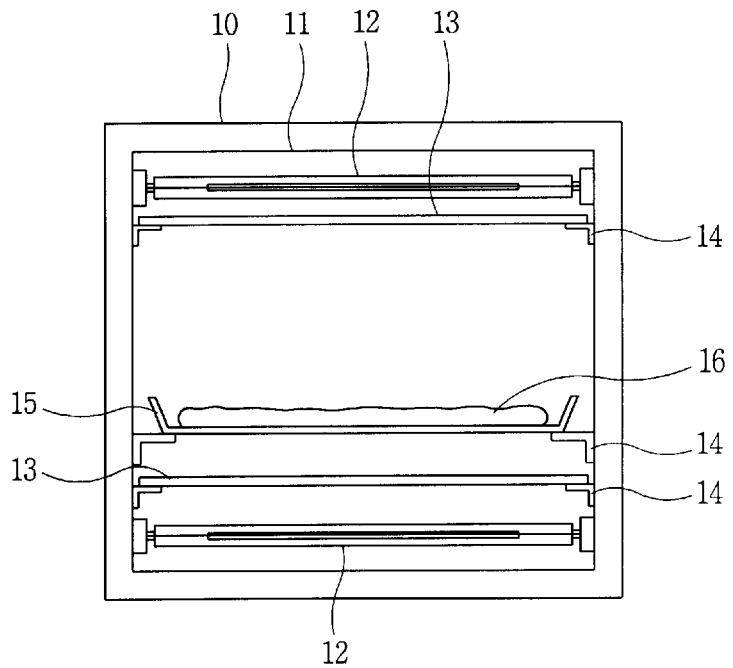
FIG. 1 is a cross-sectional view illustrating the construction of a cooking device according to the conventional art.
Figure 2:
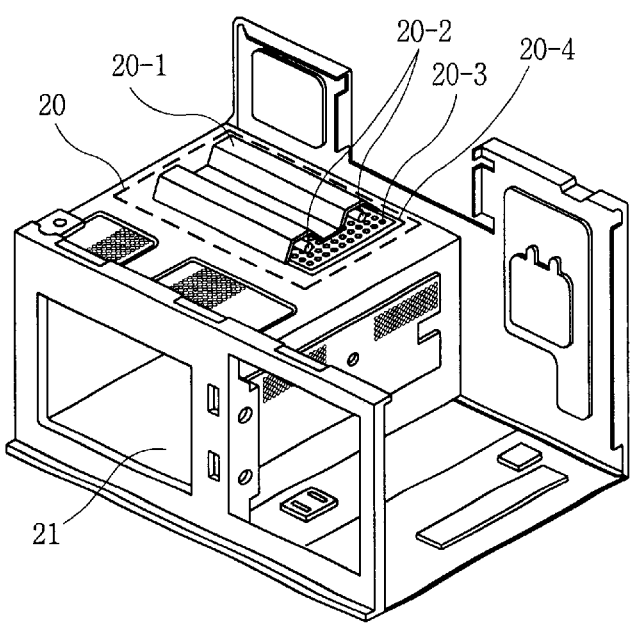
FIG. 2 is a perspective view of a cooking device according to one embodiment of the present invention.

FIG. 2 is a perspective view of a cooking device according to one embodiment of the present invention. As illustrated therein, a heater 20 includes: halogen lamps 20-2 for emitting light in an infrared light region within the wavelength range of more than 1.35 μm at more than 65% of the total radiant energy; a reflecting plate 20-1 installed at an upper portion of the halogen lamps 20-2 and adapted to reflect the light emitted from the halogen lamps 20-2 to a target product; a mesh unit 20-3 having a plurality of penetration holes installed at a lower portion of the halogen lamps 20-2 for thereby passing the light emitted from the halogen lamps 20-2 and the light reflected from the reflecting plate 20-1; and a filter 20-4 installed at a lower portion of the mesh unit 20-3 for thereby protecting the halogen lamps 20-2 and directly passing the light emitted from the mesh unit 20-3; and a cooking chamber 21 for cooking food products. A detailed description thereof will now be described with reference to FIG. 3.

Figure 3:
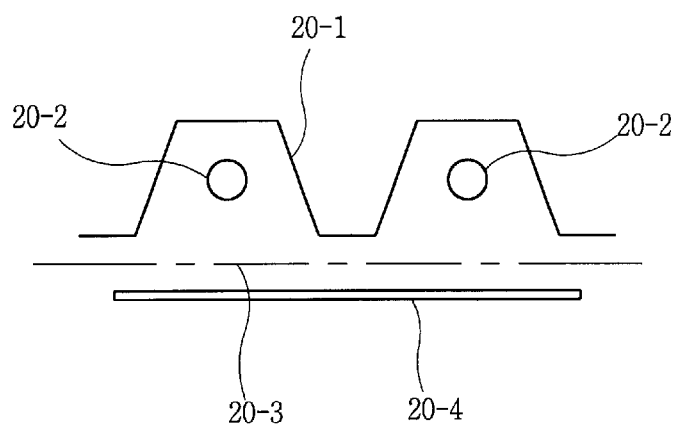
FIG. 3 is a cross-sectional view expanding a heater portion of FIG. 2.

FIG. 3 is a cross-sectional view expanding the heater 20 portion of FIG.

First, the halogen lamps 20-2 emit light in the infrared light region within the wavelength range of more than 1.35 μm at more than 65% of the total radiant energy. The wavelength of the radiant energy emitted from the halogen lamp 20-2 varies according to the temperature of filament (tungsten) which is a heat source.

Here, in case of using the halogen lamp 20-2 in the cooking device for cooking food products, it is effective to allow a light with a wavelength appropriate for cooking of the food product to be emitted.

On the other hand, in case of using the halogen lamp 20-2 for lighting purposes, it is effective to allow the majority of radiant energy to be emitted from visible light by increasing the temperature (color temperature) of a filament.

Accordingly, the halogen lamp 20-2 have a color temperature than 2400KK so as to emit a light with a wavelength appropriate for cooking of the food product.

Various methods are available in order to adjust the color temperature of the halogen lamp 20-2 to 2400K. For example, the halogen lamp 20-2 are designed to have a saturated temperature of 2400K by adjusting a power density according to the length of the lamp, diameter of heat rays, resistance, and the like, when fabricating the filament of the halogen lamp 20-2. Afterwards, when power is applied to the halogen lamp 20-2, the filament of the halogen lamp 20-2 becomes in a saturated condition upon reaching a predetermined temperature (2400K) according to the above designed power density, and thereafter is no more increased.

If the color temperature is too low, the strength of the radiant energy of the halogen lamp 20-2 becomes smaller. Thus, a proper color temperature is 1600K at minimum, and preferably 2200K.

Then, the reflecting plate 20-1 is installed at an upper portion of the respective halogen lamp 20-2 to concentrate the light emitted from the halogen lamp 20-2 into the cooking chamber 21. That is, it serves to reflect the light emitted from the halogen lamp 20-2 into the cooking chamber 21 so as not to be emitted to the outside.

In addition, the reflecting plate 20-1 is coated with stainless or aluminum, which is metal material, because it must reflect the light generated from the halogen lamp 20-2, rather than absorb it, so that there may occur no loss of the energy generated from the halogen lamp 20-2.

The mesh unit 20-3 is installed at a lower portion of the halogen lamp 20-2 and has a plurality of penetration holes so that the light emitted from the halogen lamp 20-2 and the light reflected by the reflecting plate 20-1 can be incident onto the cooking chamber 21.

The filter 20-4 is installed at a lower portion of the mesh unit 20-3 to protect the halogen lamp 20-2 and make the light passing through the mesh unit 20-3 incident onto the cooking chamber 21 inside the cooking device. Here, the filter 20-4 is formed of ceramic or glass ceramic material.

Afterwards, the incident light impinges onto a target product (food product) in the cooking chamber 21 inside the cooking device.

Figure 4:
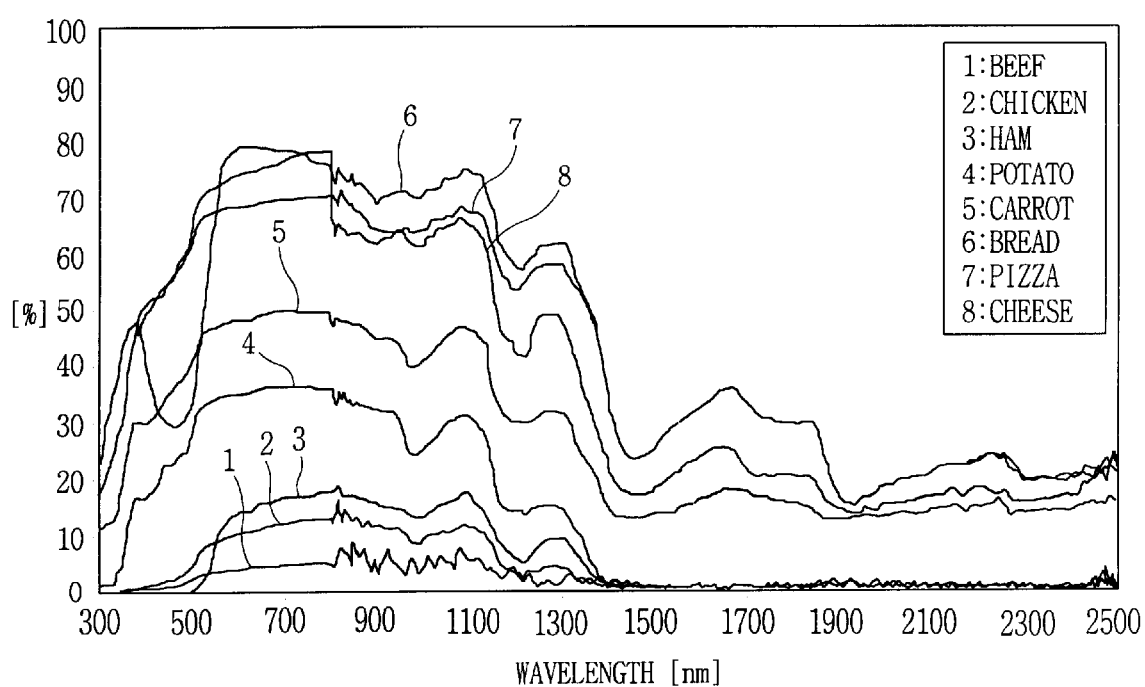
FIG. 4 is a graph illustrating the reflectance ratio according to the wavelength of a light with respect to a variety of food products.

FIG. 4 is a graph illustrating the reflectance ratio according to the wavelength of a light with respect to a variety of food product. As illustrated therein, food products absorb energy in the infrared light region, and reflect energy in the visible light region in general.

Therefore, it is possible to rapidly cook the food product due to a high absorption rate by applying infrared light to the food product.

Figure 5:
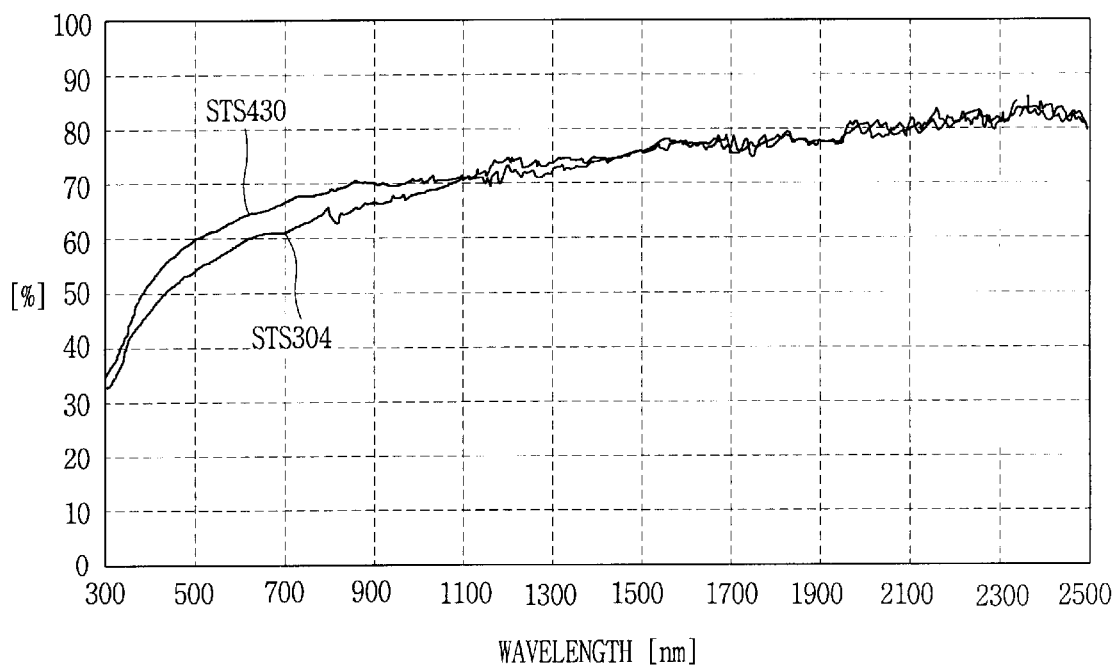
FIG. 5 is a graph illustrating the reflectance ratio according to the wavelength of a light with respect to a reflecting plate of stainless material.

FIG. 5 is a graph illustrating the reflectance ratio according to the wavelength of a light with respect to a reflecting plate of stainless material (STS 430, STS 304). As illustrated therein, it can be known that the reflectance ratio is higher in the infrared light region as compared to the visible light region.

Figure 6:
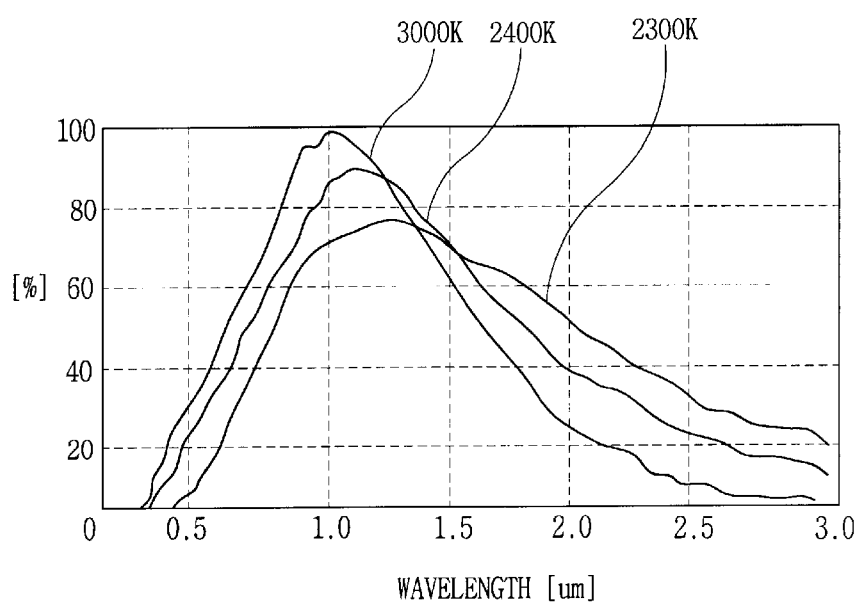
FIG. 6 is a graph illustrating the spectral distribution according to the color temperature of a light emitted from a halogen lamp.

FIG. 6 is a graph illustrating the spectral distribution according to the color temperature of a light emitted from the halogen lamp 20-2. That is, in order to find out how the spectral distribution of the light emitted is differentiated according to the color temperature of a light, the spectral distribution according to the color temperature of the light emitted from the halogen lamp 20-2 is examined for illustration. Here, "spectral" means that a light is divided into a variety of color bands according to the difference in wavelength.

As illustrate therein, by the above spectral distribution, it can be known that the peak point representing a maximum strength moves toward a long wavelength region as a color temperature becomes lower. The area of the portion below the respective spectral distribution curve represents the energy of an emitted light. In other words, it can be known that the energy in the long wavelength region becomes larger.

The ratio of radiant energy according to a-wavelength region with respect to the above color temperatures 2300K and 2400K is illustrated in Table 1.

TABLE 1

| Color temperature | 2300K | 2400K |
| --- | --- | --- |
| Ratio of radiant energy according to wavelength region (%) | | |
| 0.4~0.7 $\mu$m | 2.11% | 2.8% |
| 1.0 $\mu$m | 12% | 14% |
| 0.4~1.35 $\mu$m | 29.6% | 33% |
| 1.35 $\mu$m~∞ | 70.4% | 67% |

The above wavelength range of 0.4~0.7 $\mu$m is a visible light region, and the above wavelength range of 1.0 $\mu$m is an intermediate range of a near infrared light region. The wavelength range of 0.4~1.35 $\mu$m is a visible light region and near infrared light region. In addition, the wavelength range of more than 1.35 $\mu$m is a infrared light region.

As seen from Table 1, since the radiant energy of the infrared light region is larger at a color temperature of 2300K which is lower than 2400K, a light in a range of lower color temperature is used in order to increase the radiant energy in the infrared light region.

In addition, by differentiating the wavelength range of an emitted light as described above, it is made possible to selectively adjust the cooking time according to the type of food product, in particular, to rapidly cook the food product requiring rapid cooking.

As described above, in the present invention, since the halogen lamp 20-2 emits light in the infrared light region onto the food product, the food product absorbs well the emitted light in the infrared light region, thus cooking the food product within a short time.

In addition, the reflecting plate of stainless material allows the light in the infrared light region to be concentrated on the food product, thus much reducing the cooking time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a cooking device for cooking food products using a heater, a rapid cooking device using infrared light, comprising:

a halogen lamp for emitting light in a infrared light region within a wavelength range of more than 1.35 μm at more than 65% of the total radiant energy;

a reflecting plate installed at an upper portion of the halogen lamp and reflecting the light emitted from the halogen lamp;

a mesh unit having a plurality of penetration holes installed at a lower portion of the halogen lamp to directly pass the light emitted from the halogen lamp and the light reflected by the reflecting plate;

a filter installed at a lower portion of the mesh unit for protecting the halogen lamp; and a food platter for holding the food, the mesh unit being so situated that the light passing therethrough is able to strike the food located on the food platter.

2. The device of claim 1, wherein the halogen lamp emits light within a color temperature range from 900K to 2400K.

3. The device of claim 1, wherein at least one luminous member, other than the halogen lamp, is installed at an upper portion of the mesh unit.

* * * * *